US011990295B2

(12) United States Patent
Yang et al.

(10) Patent No.: US 11,990,295 B2
(45) Date of Patent: May 21, 2024

(54) KEYSWITCH AND ILLUMINATED KEYSWITCH

(71) Applicant: Darfon Electronics Corp., Taoyuan (TW)

(72) Inventors: Chen Yang, Taoyuan (TW); Ling-Hsi Chao, Taoyuan (TW); Shao-Lun Hsiao, Taoyuan (TW); Yu-Chun Hsieh, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 18/066,412

(22) Filed: Dec. 15, 2022

(65) Prior Publication Data

US 2023/0197365 A1 Jun. 22, 2023

Related U.S. Application Data

(60) Provisional application No. 63/361,375, filed on Dec. 16, 2021, provisional application No. 63/356,558, filed on Jun. 29, 2022.

(51) Int. Cl.
*H01H 3/12* (2006.01)
*H01H 13/83* (2006.01)

(52) U.S. Cl.
CPC ............ *H01H 3/125* (2013.01); *H01H 13/83* (2013.01); *H01H 2219/018* (2013.01); *H01H 2219/062* (2013.01)

(58) Field of Classification Search
CPC ........... H01H 2003/00; H01H 2003/12; H01H 2003/32; H01H 2003/46; H01H 2003/463;
(Continued)

(56) References Cited

U.S. PATENT DOCUMENTS

| | | | |
|---|---|---|---|
| 6,444,933 | B1 | 9/2002 | Chun |
| 7,022,927 | B2 | 4/2006 | Hsu |

(Continued)

FOREIGN PATENT DOCUMENTS

| | | |
|---|---|---|
| CN | 2423647 Y | 3/2001 |
| CN | 202523604 U | 11/2012 |

(Continued)

OTHER PUBLICATIONS

TW Office Action dated Aug. 14, 2023 in Taiwan application No. 111137775.

(Continued)

*Primary Examiner* — Anthony R Jimenez
(74) *Attorney, Agent, or Firm* — McClure, Qualey & Rodack, LLP

(57) ABSTRACT

An illuminated keyswitch includes a keycap, a pair of frames adapted to support the keycap in an up-down movement, the pair of frames disposed corresponding to each other and substantially rotatably coupled to each other to define an inner space under the keycap, a pair of elastic members connecting the pair of frames to be located at two opposite sides of the inner space, respectively, and an illumination light source disposed between the pair of elastic members in the inner space and adapted to provide an illumination light. During the up-down movement of the keycap, a vertical projection of the pair of frames surrounds the inner space without interfering therewith, so the illumination light passes the inner space to illuminate the keycap.

19 Claims, 9 Drawing Sheets

(58) Field of Classification Search

CPC ........... H01H 2013/00; H01H 2013/02; H01H 2013/50; H01H 2013/52; H01H 1/12; H01H 1/20; H01H 1/2008; H01H 1/22; H01H 1/221; H01H 1/24; H01H 1/26; H01H 1/268; H01H 1/5844; H01H 5/00; H01H 5/06; H01H 5/18; H01H 3/00; H01H 3/02; H01H 3/12; H01H 3/125; H01H 3/30; H01H 3/3042; H01H 3/32; H01H 3/305238; H01H 13/00; H01H 13/04; H01H 13/14; H01H 13/26; H01H 13/50; H01H 13/52; H01H 13/70; H01H 13/702; H01H 13/807; H01H 13/83; H01H 2219/00; H01H 2219/01018; H01H 2219/06; H01H 2219/062

See application file for complete search history.

(56) References Cited

U.S. PATENT DOCUMENTS

| | | | | |
|---|---|---|---|---|
| 9,634,661 | B1 * | 4/2017 | Chen | H03K 17/969 |
| 9,952,682 | B2 | 4/2018 | Zhang | |
| 10,200,034 | B2 | 2/2019 | Wu | |
| 10,840,038 | B2 | 11/2020 | Hao | |
| 10,910,172 | B2 | 2/2021 | Wu | |
| 11,114,260 | B2 | 9/2021 | Li | |
| 11,342,134 | B2 * | 5/2022 | Ruff | H01H 3/125 |
| 2005/0217983 | A1 | 10/2005 | Hsu | |
| 2017/0264294 | A1 | 9/2017 | Li | |
| 2019/0267200 | A1 | 8/2019 | Wu | |
| 2020/0294733 | A1 | 9/2020 | Ruff | |
| 2020/0328044 | A1 | 10/2020 | Chao | |
| 2020/0381190 | A1 | 12/2020 | Ruff | |
| 2020/0402735 | A1 | 12/2020 | Chuang | |

FOREIGN PATENT DOCUMENTS

| | | | | |
|---|---|---|---|---|
| CN | 104299828 | A | 1/2015 | |
| CN | 204441139 | U | 7/2015 | |
| CN | 20506398 | U | 2/2016 | |
| CN | 205487874 | U | 8/2016 | |
| CN | 106887358 | A | 6/2017 | |
| CN | 107017870 | A | 8/2017 | |
| CN | 109390177 | A | 2/2019 | |
| CN | 110047677 | A | 7/2019 | |
| CN | 110379661 | A | 10/2019 | |
| CN | 209627348 | U | 11/2019 | |
| CN | 108962654 | B * | 3/2020 | H01H 13/14 |
| CN | 111180233 | A | 5/2020 | |
| CN | 111684559 | A | 9/2020 | |
| CN | 108206112 | B | 4/2021 | |
| TW | 200534312 | A | 10/2005 | |
| TW | I246701 | B | 1/2006 | |
| TW | I665701 | B | 7/2019 | |
| TW | M603617 | U | 11/2020 | |
| WO | 2018107741 | A1 | 6/2018 | |
| WO | 2021159222 | A1 | 8/2021 | |

OTHER PUBLICATIONS

TW Office Action dated Jan. 6, 2023 in Taiwan application No. 111132826.

Non-Final Office Action issued in U.S. Appl. No. 18/071,533, filed Nov. 29, 2022, dated Oct. 12, 2023.

Non-Final Office Action issued in U.S. Appl. No. 17/989,703, filed Nov. 18, 2022, dated Oct. 12, 2023.

U.S. Appl. No. 18/071,533, filed Nov. 29, 2022.

U.S. Appl. No. 18/081,712, filed Dec. 15, 2022.

U.S. Appl. No. 17/989,703, filed Nov. 18, 2022.

TW Office Action dated Aug. 7, 2023 in Taiwan application No. 111148301.

* cited by examiner

KEYSWITCH AND ILLUMINATED KEYSWITCH

BACKGROUND OF THE INVENTION

1. Field of the Invention

The invention generally relates to a keyswitch structure. Particularly, the invention relates to a keyswitch and an illuminated keyswitch.

2. Description of the Prior Art

The conventional keyswitch generally includes a support mechanism for supporting the keycap in the up-down movement and a restoring unit for enabling the support mechanism and the keycap to return to their initial positions. The commonly used restoring unit includes a rubber dome or a tension spring, which is generally disposed at the center region of the support mechanism. Consequently, the central space of the keyswitch cannot be well utilized, which limits the feasibility of developing keyswitches (particularly the illuminated keyswitch).

In general, due to the limitation to space requirements of the support mechanism and the restoring unit, the illumination light source is usually disposed at a position deviating from the central region of the keyswitch, so the illumination light can only illuminate the entire keycap from the side, resulting in non-unform brightness of the symbols on the keycap. Moreover, even if the illumination light source is disposed proximate to the central region of the keyswitch, due to the blocking effect of the keyswitch components (the support mechanism, the restoring unit, etc.), the intensity of the illumination light is attenuated, or the illumination area of the illumination light is partially interfered, also resulting in non-unform brightness of the symbols on the keycap.

SUMMARY OF THE INVENTION

It is an object of the invention to provide an illuminated keyswitch, which has an illumination light source arranged at the central position to effectively increase the central backlight range, so as to enhance the luminous uniformity of the illuminated keyswitch.

It is another object of the invention to provide an illuminated keyswitch, which has a substantially unobstructed inner space structure and a centrally positioned illumination light source, so as to effectively promote the luminous uniformity of the illuminated keyswitch.

In an embodiment, the invention provides an illuminated keyswitch including a keycap, a pair of frames, a pair of elastic members, and an illumination light source. The pair of frames is adapted to support the keycap in an up-down movement. The pair of frames is disposed corresponding to each other and substantially rotatably coupled to each other to define an inner space under the keycap. The pair of elastic members connects the pair of frames to be located at two opposite sides of the inner space, respectively. The illumination light source is disposed between the pair of elastic members in the inner space and adapted to provide an illumination light. During the up-down movement of the keycap, a vertical projection of the pair of frames surrounds the inner space without interfering therewith, so the illumination light passes the inner space to illuminate the keycap.

In an embodiment, the illuminated keyswitch of the invention further includes an optical switch having an optical signal path, and the illumination light source is disposed in a straight line with the optical signal path.

In an embodiment, the illuminated keyswitch of the invention further includes a light shield at least partially shielding the optical switch to separate the optical switch and the illumination light source.

In an embodiment, the optical switch includes an emitter and a receiver. The emitter emits an optical signal to the receiver. The light shield has a baffle configured to separate the emitter and the receiver. The baffle has a slit for the optical signal to pass therethrough.

In an embodiment, one of the pair of frames has a blocking portion configured to selectively block the optical signal path in response to a movement of the pair of frames.

In an embodiment, the illuminated keyswitch of the invention further includes an optical member disposed between the illumination light source and the keycap. The optical member is configured to modulate an optical property of the illumination light.

In an embodiment, each of the pair of frames has a keycap end and a baseplate end, and each of the pair of the elastic members connects the baseplate ends of the pair of frames.

In an embodiment, the baseplate end of one of the pair of frames is closer to the keycap end of the other of the pair of frames than the baseplate end of the other of the pair of frames.

In an embodiment, during the up-down movement of the keycap, the pair of elastic members substantially does not move up-down with the keycap.

In an embodiment, the pair of frames is substantially identical. Each of the pair of frames is a U-shaped frame with a pair of side arms. The pair of frames is disposed corresponding to each other to substantially avoid an illumination area of the illumination light without interfering with the illumination light.

In an embodiment, the pair of side arms of one of the pair of frames and the pair of side arms of the other of the pair of frames are alternatingly disposed along an axial line.

In an embodiment, each of the pair of frames has an extension portion at the keycap end. The extension portion extends from one of the pair of side arms, so the extension portion of one of the pair of frames corresponds to one of the pair of side arms of the other of the pair of frames, and the pair of frames has a substantially rectangular contour in a plan view.

In an embodiment, each of the pair of frames has a pair of bend structures respectively disposed on middle sections of the pair of side arms. The pair of bend structures of the one of the pair of frames is correspondingly coupled to the pair of bend structures of the other of the pair of frames along a direction parallel to the axial line, so the pair of frames is rotatably coupled to each other.

In an embodiment, the pair of bend structures includes a receiving portion and a pressing portion. The pressing portion of one of the pair of frames interacts with the receiving portion of the other of the pair of frames, and the receiving portion of the one of the pair of frames interacts with the pressing portion of the other of the pair of frames.

In another embodiment, the invention provides a keyswitch, which has a substantially unobstructed inner space structure, facilitating the space arrangement of keyswitch components, so as to effectively increase the feasibility of developing the keyswitch.

In an embodiment, the invention provides a keyswitch including a keycap, a pair of U-shaped frames, and a pair of elastic members. The pair of U-shaped frames is adapted to support the keycap in an up-down movement. The pair of U-shaped frames is disposed corresponding to each other and substantially rotatably coupled to each other along an axial line. Each of the pair of U-shaped frames has a pair of side arms extending in parallel. The four side arms of the pair of U-shaped frames constitute two sets of side arms, which are arranged apart from each other in parallel to define an inner space under the keycap between the two sets of side arms. The pair of elastic members connects the pair of U-shaped frames. The pair of elastic members is disposed in parallel beside the two sets of side arms so as to be located at two opposite sides of the inner space, respectively. The pair of elastic members connects the pairs of U-shaped frames along a direction perpendicular to the axial line. During the up-down movement of the keycap, a vertical projection of the pair of U-shaped frames and a vertical projection of the pair of elastic members surround the inner space without interfering therewith.

In an embodiment, the pair of U-shaped frames is substantially identical. Each of the pair of U-shaped frames has a keycap end and a baseplate end. The baseplate end of one of the pair of U-shaped frames is closer to the keycap end of the other of the pair of U-shaped frames than the baseplate end of the other of the pair of U-shaped frames. Each of the pair of the elastic members connects the baseplate ends of the pair of U-shaped frames.

In an embodiment, each of the pair of U-shaped frames has an extension portion at the keycap end. The extension portion extends from one of the pair of side arms, so the extension portion of one of the pair of U-shaped frames corresponds to one of the pair of side arms of the other of the pair of U-shaped frames.

In an embodiment, the pair of side arms of one of the pair of U-shaped frames and the pair of side arms of the other of the pair of U-shaped frames are alternatingly disposed along the axial line.

In an embodiment, each of the pair of U-shaped frames has a pair of bend structures respectively disposed on middle sections of the pair of side arms. The pair of bend structures of one of the pair of U-shaped frames is correspondingly coupled to the pair of bend structures of the other of the pair of U-shaped frames along a direction parallel to the axial line, so the pair of U-shaped frames is rotatably coupled to each other.

In an embodiment, the keyswitch of the invention further includes an optical switch having an optical signal path. One of the pair of U-shaped frames has a blocking portion configured to selectively block the optical signal path in response to a movement of the pair of U-shaped frames.

Compared with the prior art, the keyswitch of the invention provides a substantially unobstructed inner space, which facilitates the space arrangement of keyswitch components and increase the feasibility of development of the keyswitch, particularly the development of illuminated keyswitch. Moreover, the illuminated keyswitch of the invention has a substantially unobstructed inner space structure and a centrally positioned illumination light source to effectively increase the central backlight range, so as to promote the luminous uniformity of the illuminated keyswitch.

DETAILED DESCRIPTION OF THE PREFERRED EMBODIMENT

Figure 1:
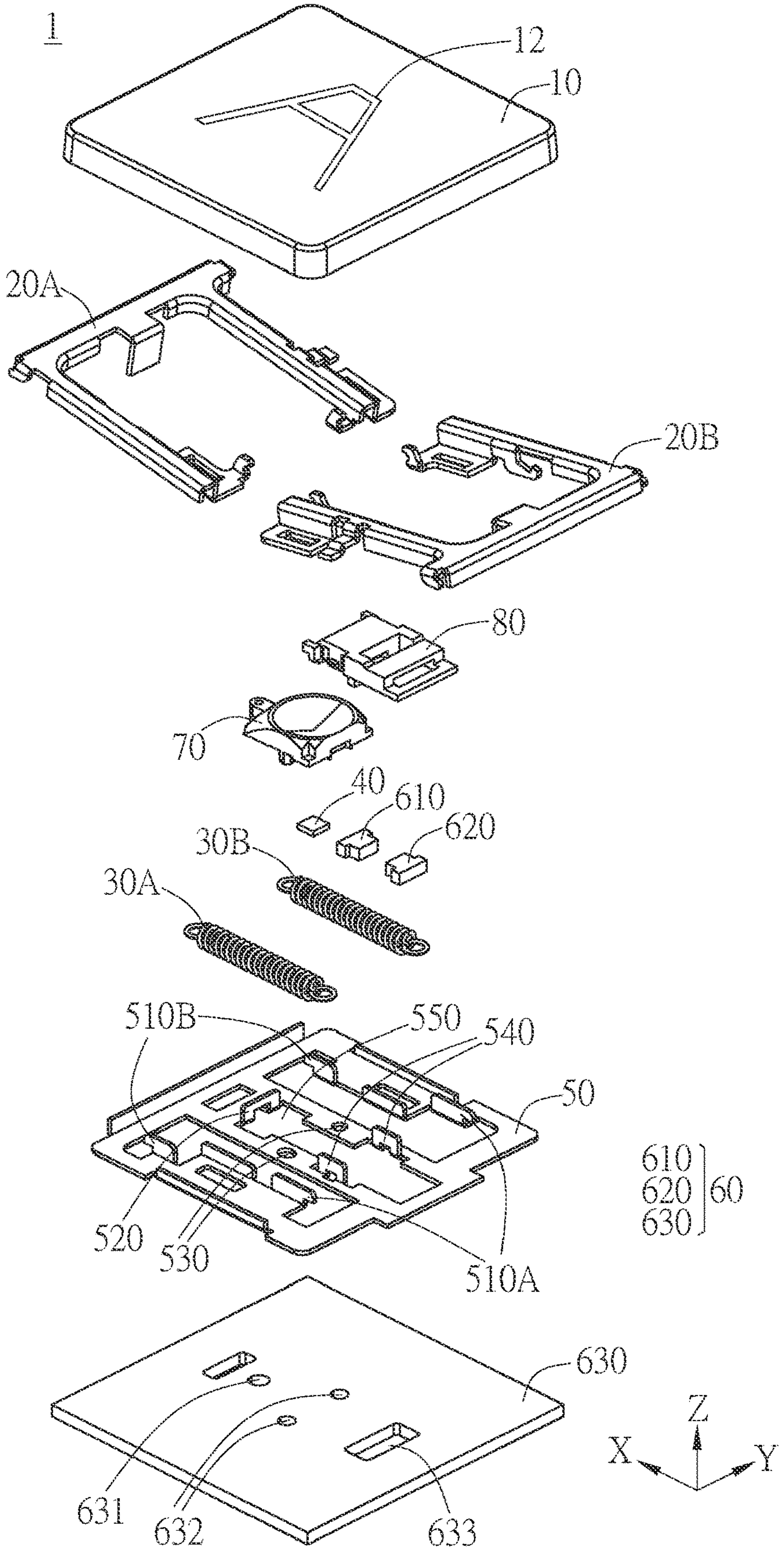
FIG. 1 is a schematic exploded view of the (illuminated) keyswitch in an embodiment of the invention.

The invention provides a keyswitch having an unobstructed inner space. Particularly, the keyswitch of the invention can be a keyswitch of the keyboard, but not limited thereto. The keyswitch of the invention can be any keyswitch structure that needs to effectively utilize the central inner space, such as illuminated keyswitch, but not limited thereto. Hereinafter, the structure and operation of the keyswitch of the invention will be described in detail with reference to the drawings.

As shown in FIG. 1 to FIG. 4, in an embodiment, the keyswitch 1 includes a keycap 10, a pair of frames 20A and 20B, a pair of elastic members 30A and 30B, a baseplate 50, and an optical switch 60. In this embodiment, the keyswitch 1 may further include an illumination light source 40, an optical member 70, and a light shield 80 to function as an illuminated keyswitch. Hereinafter, taking the illuminated keyswitch as an example, the details of the keyswitch 1 will be described.

Figure 2:
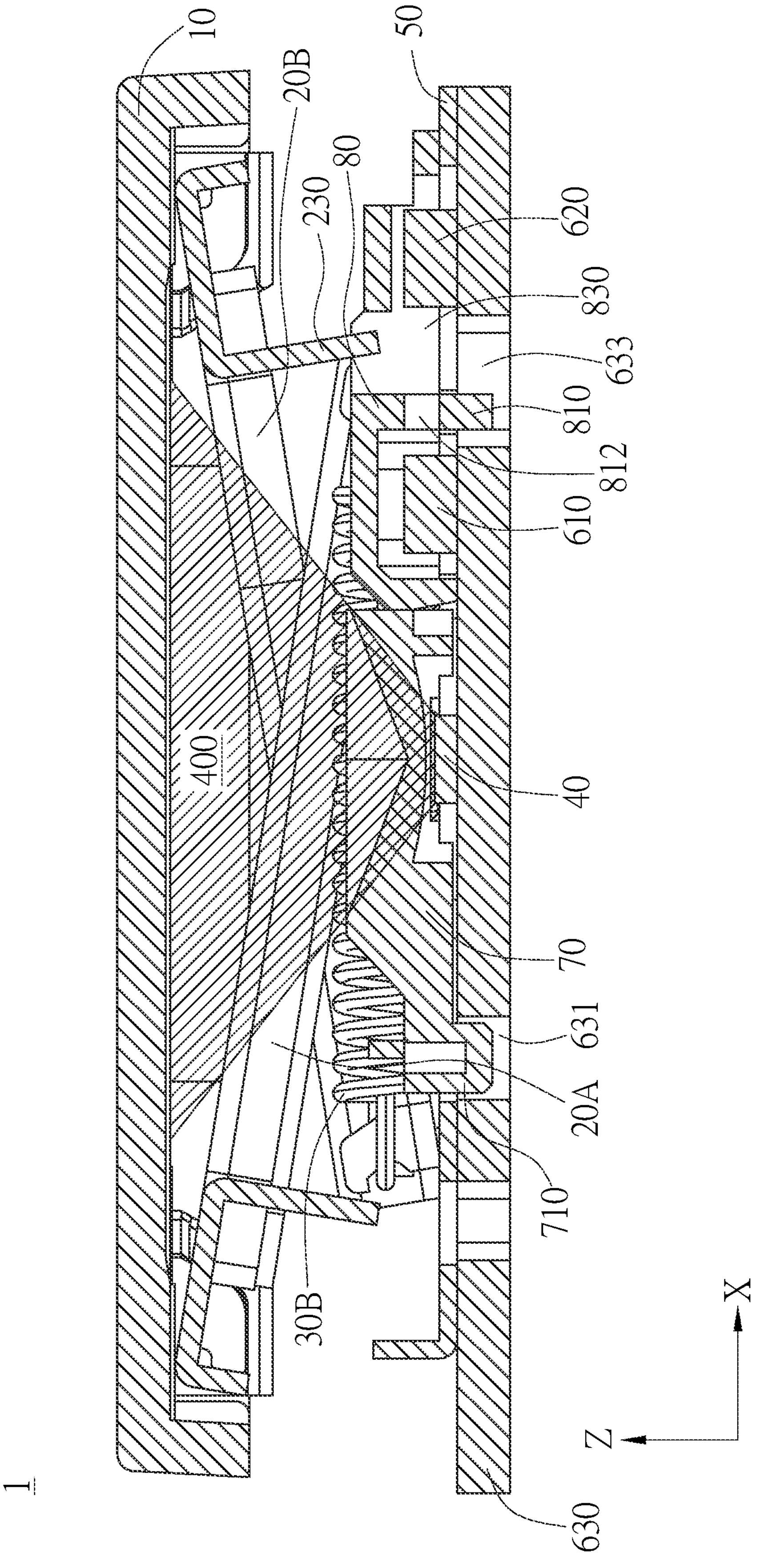
FIG. 2 is a schematic cross-sectional view of the (illuminated) keyswitch of FIG. 1.
Figure 3:
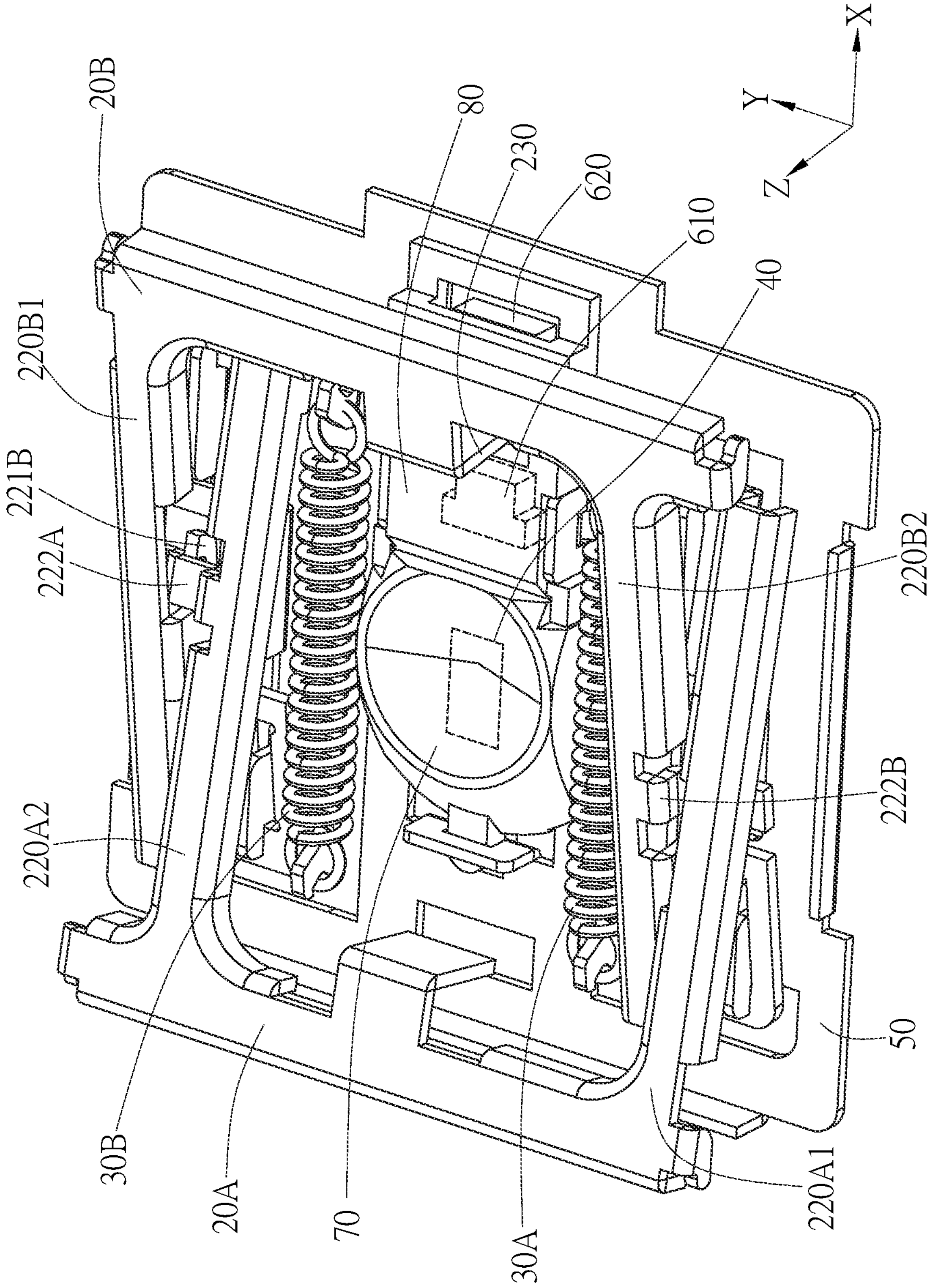
FIG. 3 is a schematic assembly view of the (illuminated) keyswitch of FIG. 1 without the keycap.

As shown in FIG. 1 and FIG. 2, the keycap 10 can be, for example, an injection-molded rectangular keycap. The keycap 10 can be a keycap with a light-permeable portion 12 to be applied to an illuminated keyswitch. For example, the light-permeable portion 12 can be in a form of pattern, such as alphabets, numbers, or any suitable characters, to indicate the instruction inputted through the keyswitch. Moreover, the keycap 10 has coupling members formed on its bottom surface to couple the pair of frames 20A and 20B, so the keycap 10 and the pair of frames 20A and 20B can form a linkage configuration.

The baseplate 50 can be a support plate to enhance the structural strength of the keyswitch 1. The baseplate 50 has connection members 510A and 510B, which are adapted to couple the pair of frames 20A and 20B. In an embodiment, the baseplate 50 is preferably a metal plate formed by stamping. The connection members 510A and 510B are preferably hook-like portions, which are bent upward from the baseplate 50 toward the keycap 10. As shown in FIG. 1, two connection members 510A for coupling the frame 20A and two connection members 510B for coupling the frame 20B are disposed at two opposite ends along the X-axis direction. Moreover, the two connection members 510A and the two connection members 510B are alternatingly disposed in the Y-axis direction. For example, in the X-axis direction, the connection members 510A is closer to the frame 20B than the connection members 510B, and the connection members 510B is closer to the frame 20A than the connection members 510A. It is noted that when other components of the keyswitch (e.g. the circuit board 630) have sufficient structural strength, the connection members 510A and 510B can be alternatively disposed on the circuit board to omit the baseplate 50.

Corresponding to the arrangement of the keyswitch components, the baseplate 50 can further have a plurality of positioning portions (e.g. 520, 530, 540), which is configured to position the optical member 70 and the light shield 80. For example, the positioning portion 520 can be a positioning structure with a hole, which is bent upward from the baseplate 50 toward the keycap 10, and the hole can be run through in the X-axis direction. The positioning portion 530 can be a through hole of the baseplate 50 extending in the Z-axis direction. The positioning portions 520 and 530 can be used to position the optical member 70. The positioning portion 540 can be a positioning structure with a hole, which is bent upward from the baseplate 50 toward the keycap 10, and the hole can be run through in the Y-axis direction. The positioning portion 540 can be used to position the light shield 80. In this embodiment, the positioning portions 520, 530, and 540 are preferably sequentially arranged along the X-axis direction, so the optical member 70 and the light shield 80 can be disposed adjacent to each other in the X-axis direction. Though the embodiment illustrates that the baseplate 50 has the positioning portions 520, 530, and 540, but not limited thereto. According to practical applications, the positioning portions of the baseplate 50 can have any suitable structure, number, and location to position corresponding keyswitch components. Moreover, the baseplate 50 can further have an opening 550, which is adapted to accommodate the illumination light source 40 and components of the optical switch 60 (e.g. emitter 620 and receiver 610). For example, the opening 550 is preferably a long-shaped opening extending along the X-axis direction, so the illumination light source 40, the receiver 610, and the emitter 620 can be disposed along the X-axis direction and protrude above the baseplate 50 from the opening 550. In this embodiment, the opening 550 is preferably an integral opening adjacent to the positioning portions 520 and 540, but not limited thereto. In other embodiment, the opening 550 can be embodied as two sub-openings, which are disposed adjacent to each other in the X-axis direction and communicate (or do not communicate) with each other.

Referring to FIG. 1 to FIG. 5, FIG. 5 is a schematic assembly plan view of the pair of frames 20A and 20B and the pair of elastic members 30A and 30B. As shown in the drawings, the pair of frames 20A and 20B is disposed between the keycap 10 and the baseplate 50 to function as a support mechanism for supporting the keycap 10 in an up-down movement, such as the up-down movement relative to the baseplate 50. The pair of frames 20A and 20B is disposed corresponding to each other and substantially rotatably coupled to each other to define an inner space under the keycap 10. The pair of elastic members 30A and 30B connects the pair of frames 20A and 20B to be located at two opposite sides of the inner space 200, respectively.

Figure 5:
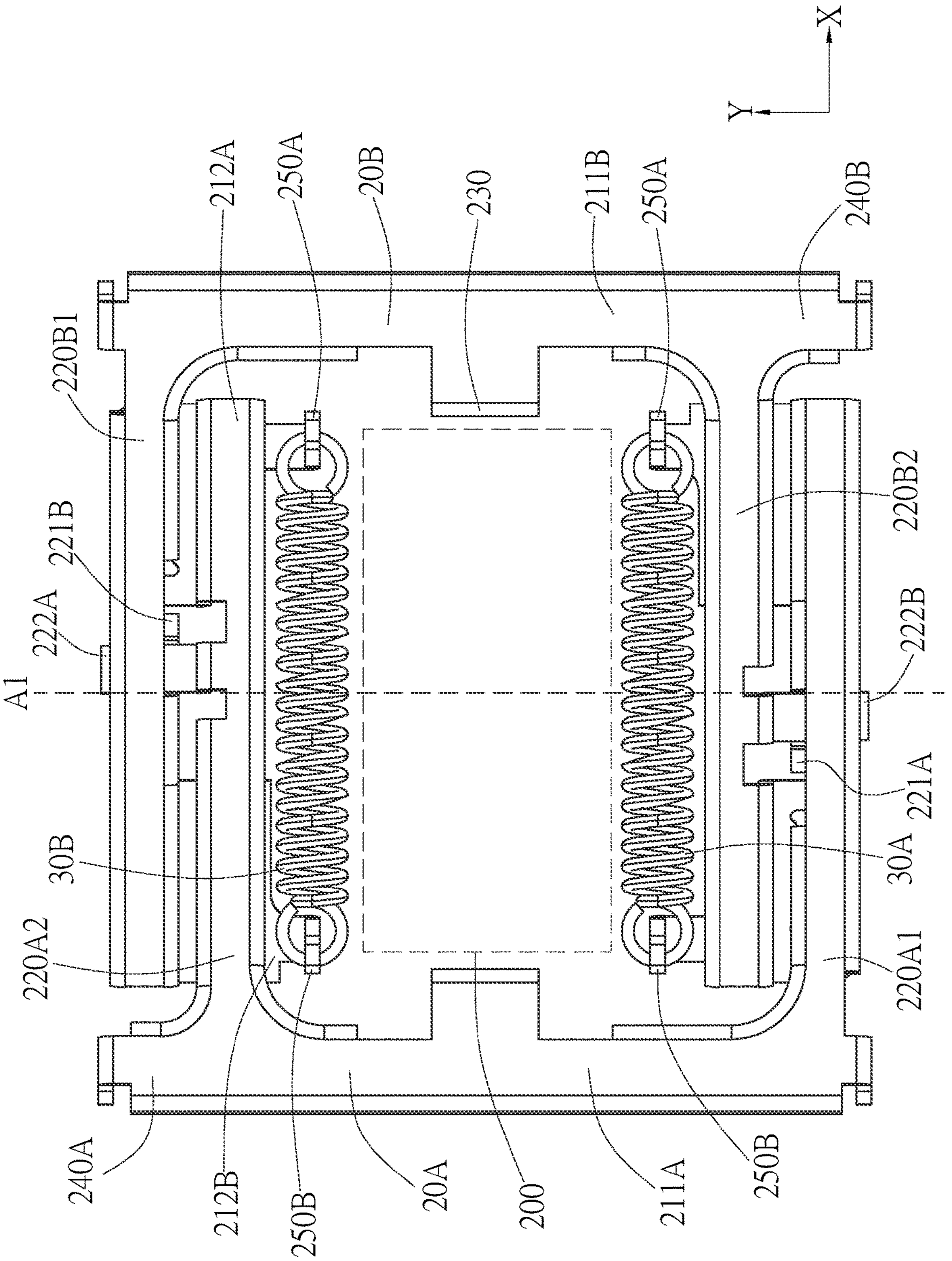
FIG. 5 is a schematic assembly view of the pair of frames and the pair of elastic members in an embodiment of the invention.
Figure 6A:
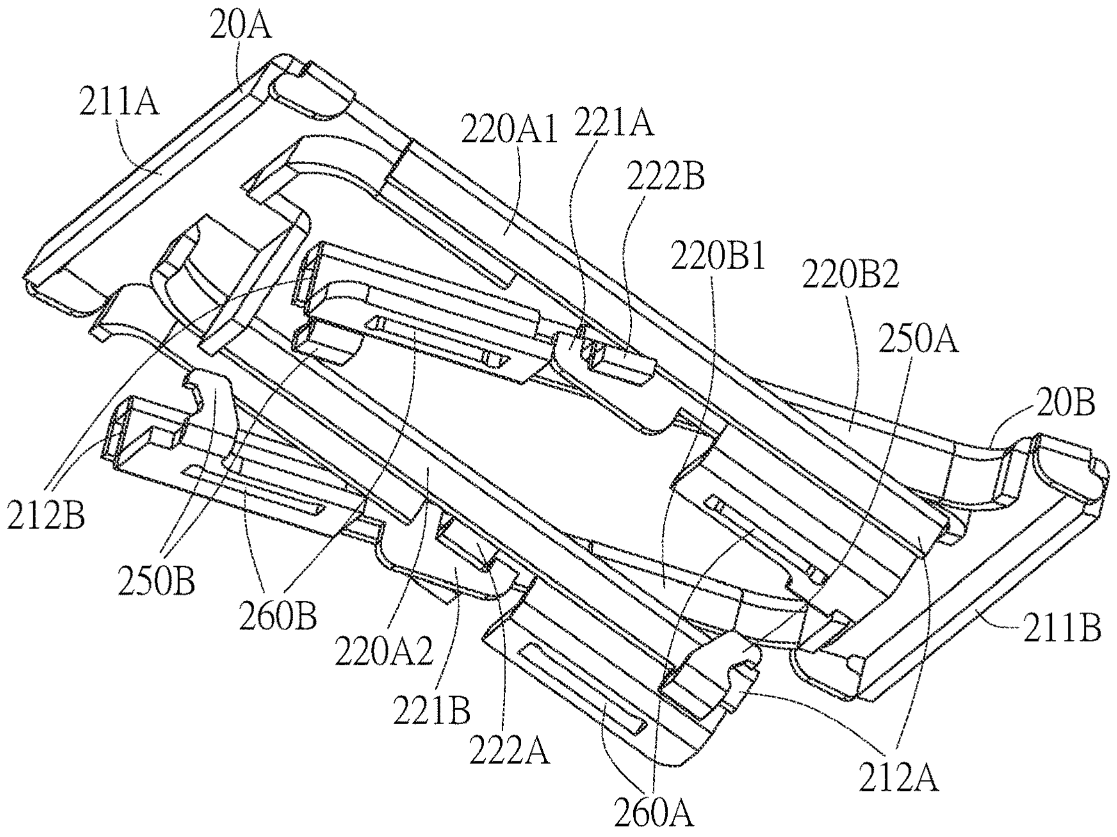
FIG. 6A is a schematic bottom view of the pair of frames in an embodiment of the invention.
Figure 6B:
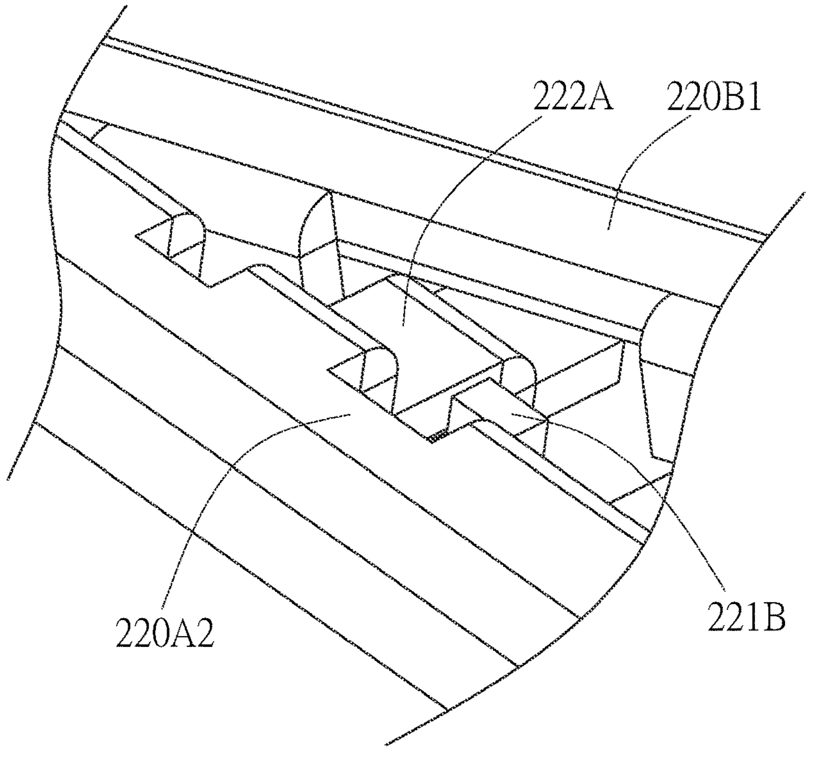
FIG. 6B is a schematic enlarged assembly view of the pair of frames in an embodiment of the invention.
Figure 7A:
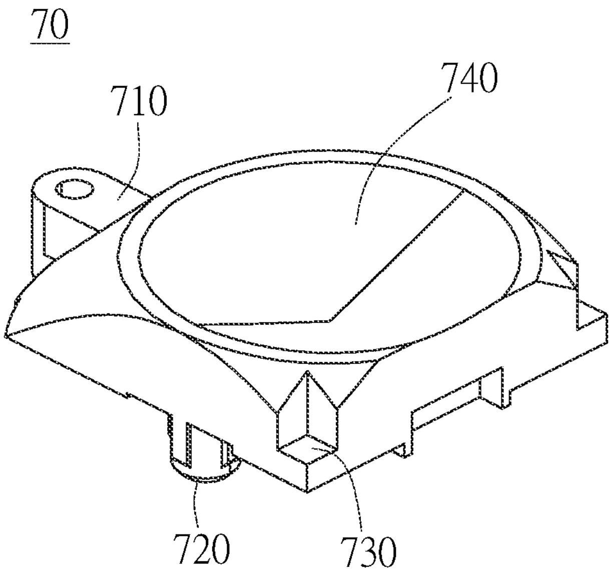
FIGS. 7A and 7B are schematic views of the optical member in an embodiment of the invention from different viewing angles.
Figure 7B:
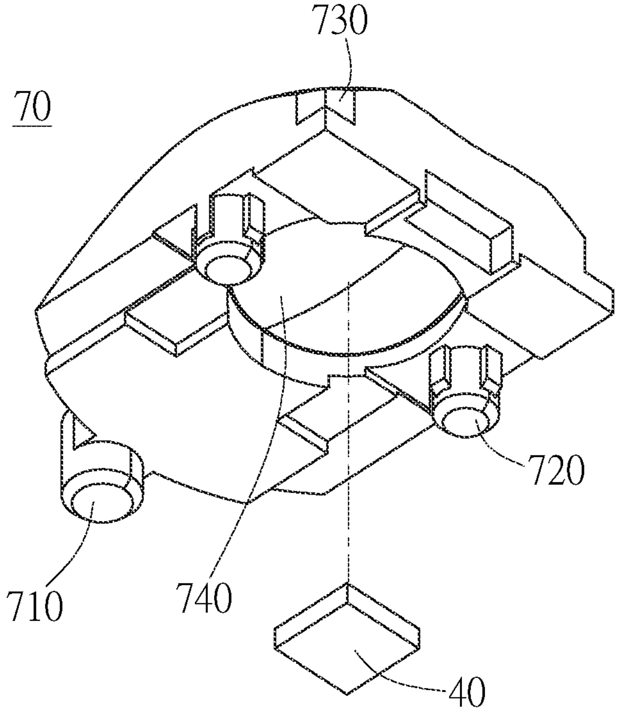

Specifically, as shown in FIG. 5, FIG. 6A and FIG. 6B, in an embodiment, the pair of frames 20A and 20B is substantially identical, and each of the pair of frames 20A and 20B is a U-shaped frame with a pair of side arms (e.g. 220A1 and 220A2, 22061 and 220B2). The phrase "the pair of frames 20A and 20B is substantially identical" refers to that when the pair of frames 20A and 20B is disposed with the openings of the U-shaped frames facing the same direction (i.e., when one of the pair of frames 20A and 20B in FIG. 5 rotates 180 degrees), vertical projections of the frames 20A and 20B substantially completely overlap. As such, the cost for manufacturing different frames can be reduced. Moreover, the pair of side arms of one of the pair of frames (e.g. side arms 220A1 and 220A2 of the frame 20A) and the pair of side arms of the other of the pair of frames (e.g. side arms of 220B1 and 220B2 of the frame 20B) are alternating disposed along an axial line A, such as Y-axis direction. For example, the pair of frames 20A and 20B is disposed corresponding to each other in the X-axis direction (i.e., the openings of the U-shaped frames face toward each other), so the side arms sequentially arranged along the axial line A1 (e.g. Y-axis direction) are side arms 220A1, 220B2, 220A2, and 220B1. The pair of side arms 220A1 and 220A2 (or 220B1 and 220B2) of the frame 20A (or 20B) substantially extends in parallel, such as parallel to the X-axis direction, so the four side arms 220A1, 220A2, 220B1, and 220B2 of the pair of frames 20A and 20B constitute two sets of side arms, which are arranged apart from each other. For example, the side arm 220A1 of the frame 20A and the side arm 220B2 of the frame 20B constitute one set of side arms, and the side arm 220A2 of the frame 20A and the side arm 220B1 of the frame 20B constitute the other set of side arms. The two sets of side arms are arranged apart from each other in substantially parallel, and the inner space is interposed between the two sets of side arms.

Each of the pair of frames 20A and 20B has a pair of bend structures (e.g. 221A and 222A, 221B and 222B), and the bens structures are respectively disposed on middle sections of the pair of side arms (e.g. 220A1 and 220A2, 220B1 and 220B2). The pair of bend structures of one of the pair of frames (e.g. 221A, 222A of the frame 20A) is correspondingly coupled to the pair of bend structures of the other of the pair of frames (e.g. 222B, 221B of the frame 20B) along a direction parallel to the axial line A1, so the pair of frames 20A and 20B is rotatably coupled to each other with the axial line A1 as the rotation axis. As shown in FIG. 6A and FIG. 6B, in an embodiment, the pair of bend structures of the frame 20A includes a receiving portion 221A and a pressing portion 222A respectively disposed on the middle sections of the side arms 220A1 and 220A2, and the pair of bend structures of the frame 20B includes a receiving portion 221B and a pressing portion 222B respectively disposed on the middle sections of the side arms 220B1 and 220B2. The pressing portion of one of the pair of frames interacts with the receiving portion of the other of the pair of frames, and the receiving portion the one of the pair of frames interacts with the pressing portion of the other of the pair of frames. For example, the pressing portion 222A of the frame 20A interacts with the receiving portion 221B of the frame 20B, and the receiving portion 221A of the frame 20A interacts with the pressing portion 222B of the frame 20B. Specifically, in an embodiment, the receiving portion 221A (or 221B) can be a hook-like structure, which extends downward (along the Z-axis direction) from the inner side of the side arm 220A1 (or 220B1) and then inclinedly extends downward along the extension direction (e.g. X-axis direction) of the side arm 220A1 (or 220B1) toward the keycap end 211A (or 211B). The pressing portion 222A (or 222B) can be a stepped structure, which extends outward (along the Y-axis direction) from the outer side of the side arm 220A2 (or 220B2) to correspond to the receiving portion 221B (or 221A). When the frames 20A and 20B are coupled by the bend structures, the side arm 220A1 of the frame 20A is located outside the side arm 220B2 of the frame 20B, and the pressing portion 222B disposed on the middle section of the side arm 220B2 protrudes toward the receiving portion

221A disposed on the middle section of the side arm 220A1, so the receiving portion 221A is coupled to and supports the pressing portion 222B, and the pressing portion 222B extends under the side arm 220A1. Similarly, the side arm 220B1 of the frame 20B is located outside the side arm 220A2 of the frame 20A, and the pressing portion 222A disposed on the middle section of the side arm 220A2 protrudes toward the receiving portion 221B disposed on the middle section of the side arm 220B1, so the receiving portion 221B is coupled to and supports the pressing portion 222A, and the pressing portion 222A extends under the side arm 220B1. As such, the pair of frames 20A and 20B is coupled to each other to form a scissors-like support mechanism.

Moreover, each of the pair of frames 20A and 20B has a keycap end 211A, 211B and a baseplate end 212A, 212B. Each of the pair of elastic members 30A and 30B is coupled to the baseplate ends 212A and 212B of the pair of frames 20A and 20B. For example, the keycap end 211A refers to the connection end of the pair of side arms 220A1 and 220A2 of the U-shaped frame (e.g. 20A), and the baseplate end 212A refers to the free ends of the pair of side arms 220A1 and 220A2. Similarly, the keycap end 211B refers to the connection end of the pair of side arms 220B1 and 220B2 of the U-shaped frame (e.g. 20B), and the baseplate end 2128 refers to the free ends of the pair of side arms 220B1 and 220B2. The baseplate end of one of the pair of frames is closer to the keycap end of the other of the pair of frames than the baseplate end of the other of the pair of frames. For example, the baseplate end 212A of the frame 20A is closer to the keycap end 211B of the frame 20B than the baseplate end 212B of the frame 20B, and the baseplate end 212B of the frame 20B is closer to the keycap end 211A of the frame 20A than the baseplate end 212A of the frame 20A. Specifically, since the pair of frames 20A and 20B is coupled by the coupling structures (e.g. the receiving portions and the pressing portions) on the middle sections of the side arms to form the scissors-like support mechanism, the free ends (i.e., the baseplate end) of the side arms of one frame extend toward the keycap end of the other frame.

As shown in FIG. 1 and FIG. 6A, corresponding to the connection members 510A and 5108 of the baseplate 50, the frames 20A and 20B have connection portions 260A and 260B, respectively. The connection portions 260A (or 260B) are preferably disposed at the baseplate ends 212A (or 2128) of the side arms 220A1 and 220A2 (or 220B1 and 220B2). The connection portion 260A (or 260B) can be a frame structure with a slot to couple the hook-like connection member 510A (or 510B). For example, the connection portions 260A and 260B respectively on the side arms 220A1 and 220B1 can extend from the inner side of the corresponding side arm toward the other side arm of the U-shaped frame (e.g. 220A2, 220B2), and the connection portions 260A and 260B respectively on the side arms 220A2 and 220B2 can extend from the outer side of the corresponding side arm to protrude outward from the U-shaped frame. In other words, the two connection portions 260A (or 260B) of the frame 20A (or 20B) preferably extend toward the same direction to be located at the inner side and the outer side of the frame 20A (or 20B), respectively.

As shown in FIG. 5, each frame 20A (or 20B) has an extension portion 240A (or 240B) at the keycap end 211A (or 211B). The extension portion 240A (or 240B) extends from one of the pair of side arms, so the extension portion of one of the pair of frames corresponds to one of the pair of side arms of the other of the pair of frames, and the pair of frames 20A and 20B has a substantially rectangular contour in a plan view. For example, the extension portion 240A of frame 20A corresponds to the side arm 220B1 of the frame 20B, and the extension portion 240B of frame 20B corresponds to the side arm 220A1 of the frame 20A, so the pair of frames 20A and 20B has a substantially rectangular contour in the plan view. Specifically, the extension portion 240A extends along the Y-axis direction from the connection end (i.e., the keycap end 211A) of the inner side arm 220A2 to be adjacent to the free end of the outer side arm 220B1 of the frame 20B. The extension portion 240B extends along the Y-axis direction from the connection end (i.e., the keycap end 211B) of the inner side arm 220B2 to be adjacent to the free end of the outer side arm 220A1 of the frame 20A. In other words, vertical projections of the extension portion 240A (or 240B) and the corresponding side arm 220B1 (or 220A1) in the X-axis direction at least partially overlap with each other, so the vertical projection of the frames 20A and 20B in the Z-axis direction has a substantially rectangular contour to facilitate the supportability and stability of the keycap 10.

As shown in FIG. 5 and FIG. 6A, the pair of elastic members 30A and 30B can be embodied in the form of springs, such as tension springs. Each of the pair of elastic members 30A and 30B is preferably coupled to the baseplate ends 212A and 212B of the pair of frames 20A and 20B. Correspondingly, each frame 20A, 20B has coupling portions 250A, 250B at the baseplate ends 212A, 212B, and the coupling portions 250A, 250B are adapted to couple the elastic members 30A, 30B. For example, the coupling portions 250A and 250B can be hook-like coupling portions, which are bent from the freed end of the corresponding side arm toward the keycap 10. In an embodiment, the coupling portion 250A (or 250B) on the side arm 220A1 (or 22061) is preferably disposed on the connection portion 206A (or 260B), so the coupling portion 250A (or 250B) is closer to the other side arm 220A2 (or 220B2) of the U-shaped frame than connection portion 206A (or 260B), i.e., the coupling portion 250A (or 250B) is closer to the center of the opening of the U-shaped frame. The coupling portion 250A (or 250B) on the side arm 220A2 (or 220B2) is preferably disposed on the inner side of the side arm 220A2 (or 220B2) to face the coupling portion 250A (or 250B) of the side arm 220A1 (or 220B1). Two ends of the elastic member 30A are coupled to the coupling portion 250A on the side arm 220A1 of the frame 20A and the coupling portion 250B on the side arm 220B2 of the frame 20B. Two ends of the elastic member 30B are coupled to the coupling portion 250A on the side arm 220A2 of the frame 20A and the coupling portion 250B on the side arm 220B1 of the frame 20B. As such, the pair of elastic members 30A and 30B respectively connects the pair of frames 20A and 20B along a direction perpendicular to the axial line A1 and is respectively located beside the two sets of side arms, so as to be located at two opposite sides of the inner space 200. During the up-down movement of the keycap 10, because the elastic members 30A and 30B are coupled to the baseplate ends 212A and 212B of the frames 20A and 20B, the pair of elastic members 30A and 30B substantially does not move up-down with the keycap 10 to facilitate the operation stability of the key-switch 1.

As shown in FIG. 5, the pair of elastic members 30A and 30B is coupled to the pair of U-shaped frames (e.g. 20A and 20B) and disposed at opposite sides of the inner space 200, so the inner space 200 is substantially located at the center region of the vertical projection of the keycap 10. That is, the inner space 200 covers the center region of the vertical projection of the keycap 10, and the center of the inner space

200 is preferably the center of the vertical projection of the keycap 10. During the up-down movement of the keycap 10, the vertical projection of the frames 20A and 20B and the vertical projection of the elastic members 30A and 30B surround the inner space 200 without interfering therewith. As such, the keyswitch 1 has a configuration with a substantially unobstructed inner space 200 to facilitate the space arrangement of the keyswitch components, so as to effectively enhance the feasibility of developing the keyswitch (e.g. the illuminated keyswitch).

As shown in FIG. 1 and FIG. 2, one of the pair of frames (e.g. 20B) preferably has a blocking portion 230, which is adapted to trigger the optical switch 60 to generate a triggering signal. For example, the blocking portion 230 is preferably a blocking piece, which extends downward from the keycap end 211B of the frame 20B. In response to the movement of the frames 20A and 20B, the blocking portion 230 can move close to or away from the optical switch 60, so the optical switch 60 can be triggered to generate the triggering signal.

As shown in FIG. 1 to FIG. 4, the optical switch 60 can include an emitter 620, a receiver 610, and a circuit board 630. The circuit board 630 is disposed under the baseplate 50 and has a switch circuit. The emitter 620 and the receiver 610 are spaced apart and disposed on the circuit board 630 to be electrically connected to the switch circuit of the circuit board 630. The emitter 620 can emit an optical signal along the optical signal path P to the receiver 610. When the intensity of the optical signal received by the receiver 610 is changed, the optical switch 60 is triggered to generate the triggering signal. For example, the emitter 620 can be any suitable emitters, which can emit the optical signal of suitable wavelength, and the optical signal emitted by the emitter 620 can include electromagnetic waves, infrared rays, or visible lights. The receiver 610 can be any suitable receivers, which can correspondingly receive the optical signal. The emitter 620 and the receiver 610 are preferably disposed along a straight line, so the optical signal path P between the emitter 620 and the receiver 610 is a straight path, but not limited thereto. In this embodiment, the emitter 620 and the receiver 610 are disposed corresponding to the blocking portion 230 to be located at two opposite sides with respect to the blocking portion 230 in the X-axis direction, so the blocking portion 230 can selectively block the optical signal path P in response to the movement of the pair of frames 20A and 20B (referring to the descriptions related to FIGS. 9A to 9C). Moreover, corresponding to the optical member 70 and the blocking portion 230, the circuit board 630 can have positioning holes 631, 632 and a groove 633. The positioning holes 631, 632 are adapted to position the optical member 70, and the groove 633 is adapted to allow the blocking portion 230 to pass therethrough, so as to increase the key stroke distance.

As shown in FIG. 1 to FIG. 4, the illumination light source 40 is disposed in the inner space 200 between the elastic members 30A and 30B. The illumination light source 40 is configured to provide the illumination light and preferably substantially disposed at the center of the inner space 200, i.e., the center of the vertical projection of the keycap 10. During the up-down movement of the keycap 10, the vertical projection of the pair of frames 20A and 20B surrounds the inner space 200 without interfering therewith, so the illumination light passes the inner space 200 to illuminate the keycap 10 without interference. As shown in FIG. 2, the illumination light of the illumination light source 40 has an illumination region 400, and the illumination region 400 substantially corresponds to the inner space 200. Specifically, the area of the illumination region 400 on the keycap 10 is preferably substantially identical to the vertical projection of the inner space 200 on the keycap 10. As such, when the illumination light emitted from the illumination light source 40 passes through the inner space 200 to illuminate the keycap 10, the illumination light is not interfered (or blocked) by the keyswitch components (i.e., the non-optical components). For example, the pair of frames 20A and 20B is disposed corresponding to each other in a manner that the frames 20A and 20B and the elastic members 30A and 30B substantially avoid the illumination region 400 of the illumination light and do not to block the illumination light. In other words, within the illumination region 400 of the illumination light, there is substantially no acting components which support the up-down movement of the keycap (such as the support mechanism and the restoring unit) and the switch component which generates the triggering signal. As such, the illumination light source 40 can be disposed at the center in the substantially unobstructed inner space 200 to effectively promote the luminous uniformity of the illuminated keyswitch. It is noted that though the elastic members 30A and 30B are illustrated outside the inner space 200 in FIG. 4, but not limited thereto. According to practical applications, the illumination region 400 of the illumination light of the illumination light source 40 can be a bowl-shaped region, in the case that the frames 20A and 20B and the elastic members 30A and 30B substantially avoid the illumination region 400 (for example, the elastic members 30A and 30B are disposed below and outside the illumination region 400), the area of the illumination region 400 on the keycap 10 can be larger than the illustrated inner space 200. From another aspect, the elastic members 30A and 30B can be disposed in the inner space 200 below the illumination region 400, i.e., the inner space 200 can cover the region where the elastic members 30A and 30B are located.

Figure 4:
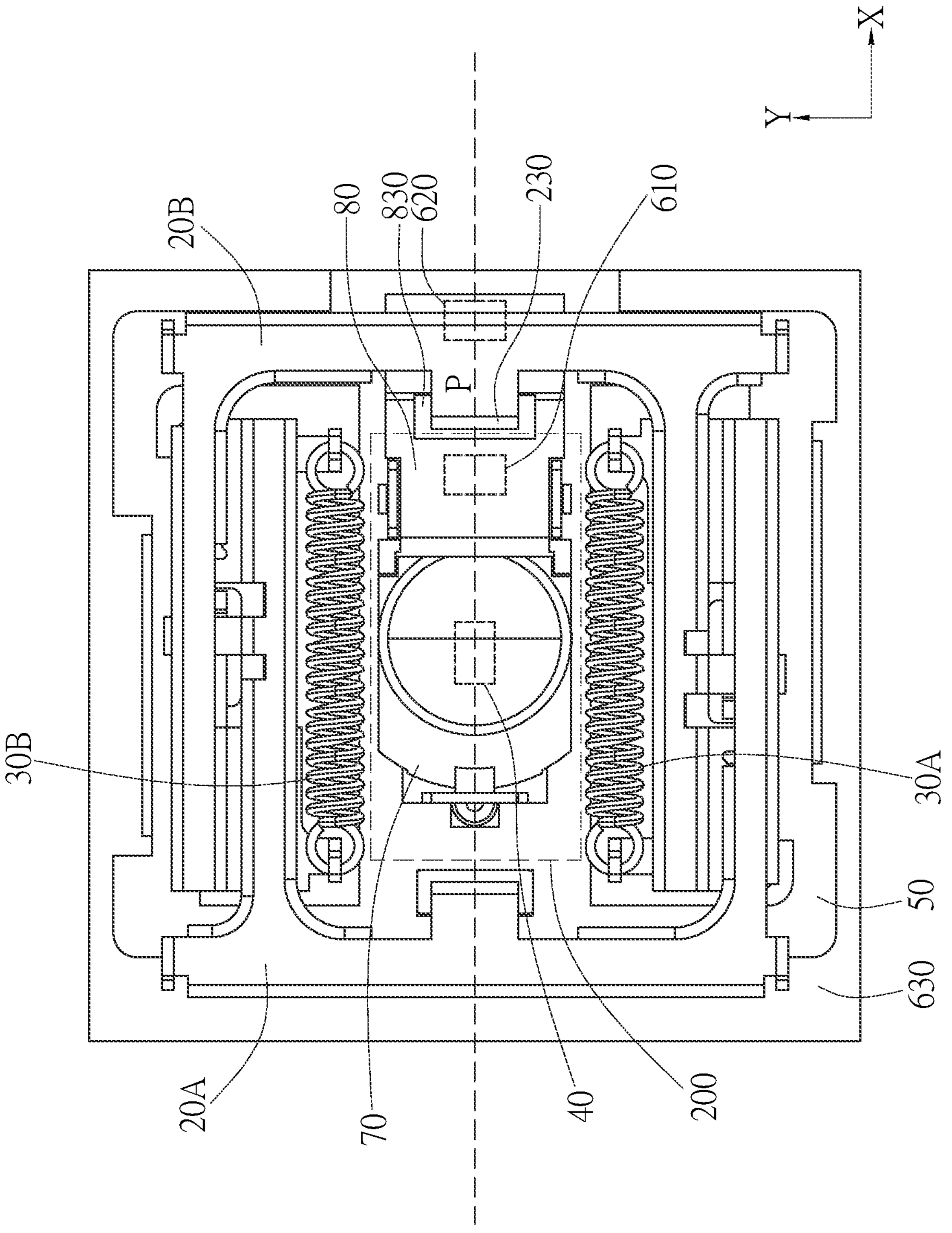
FIG. 4 is a schematic plan view of the (illuminated) keyswitch of FIG. 3.

In response to the disposition of the illumination light source 40, the circuit board 630 preferably has a light source circuit for driving the illumination light source 40. The illumination light source 40 can be disposed on the circuit board 630 and electrically connected to the light source circuit of the circuit board 630 to emit the illumination light out of the light permeable portion 12 of the keycap 10. In an embodiment, the illumination light source 40 is preferably a light-emitting diode, and the wavelength of the illumination light emitted from the illumination light source 40 is preferably different from the wavelength of the optical signal emitted from the emitter 620, so as to reduce interference, but not limited thereto. As shown in FIG. 2 and FIG. 4, the illumination light source 40 is preferably disposed at the central region of the inner space 200, i.e., the central region of the vertical projection of the keycap 10 on the baseplate 50 to effectively increase the central backlight range, so as to enhance the luminous uniformity of the illuminated keyswitch. The illumination light source 40 is preferably disposed in a straight line with the optical signal path P. For example, the illumination light source 40 is preferably disposed on the extension line of the optical signal path P between the emitter 620 and the receiver 610, so the illumination light source 40, the receiver 610, and the emitter 620 are sequentially arranged in a straight line along the X-axis direction, but not limited thereto. According to practical applications, the illumination light source 40, the emitter 620, and the receiver 610 can have different configurations. For example, the locations of the emitter 620 and the receiver 610 can be interchanged, so the illumination light source 40, the emitter 620, and the receiver 610 are sequentially arranged along the X-axis direction.

Referring to FIG. 1 to FIG. 4, FIG. 7A, and FIG. 7B, according to the need of modulating the optical property, the optical member 70 can be disposed in the illumination region 400 to modulate the optical property of the illumination light. In an embodiment, the optical member 70 is disposed between the illumination light source 40 and the keycap 10 and configured to modulate the optical property of the illumination light. Specifically, the optical member 70 can be a hood-like lens member, and the optical member 70 preferably covers the illumination light source 40. In an embodiment, the optical member 70 can have a body 740 and positioning members 710, 720. The body 740 is adapted to modulate the optical property of the illumination light (e.g. direction, uniformity of the illumination light), so the illumination light will have a desired optical property after passing through the body 740. The positioning members 710 and 720 can be disposed at any suitable locations of the body 740, so the optical member 70 can be positioned on the baseplate 50. For example, the positioning members 710 and 720 can be in a form of a post. The positioning member 710 can extend out from one side of the body 740 (e.g. the side away from the light shield 80) and protrude downward. The positioning member 720 can protrude downward from the bottom of the body 740. As shown in FIG. 1 and FIG. 2, when the optical member 70 is disposed on the baseplate 50, the optical member 70 covers the illumination light source 40, the positioning member 710 is engaged with the positioning portion 520 and inserted into the positioning hole 631 of the circuit board 630 through the opening 550, and the positioning member 720 is inserted into the positioning hole 632 of the circuit board 630 through the positioning portion 530.

Moreover, the optical member 70 can further have a limiting portion 730, which is adapted to limit or position the light shield 80. In an embodiment, the limiting portion 730 is disposed at one side of the body 740 adjacent to the light shield 80, and the limiting portion 730 can be in a form of a notch, which is configured to receive an alignment portion 820 of the light shield 80.

Figure 8A:
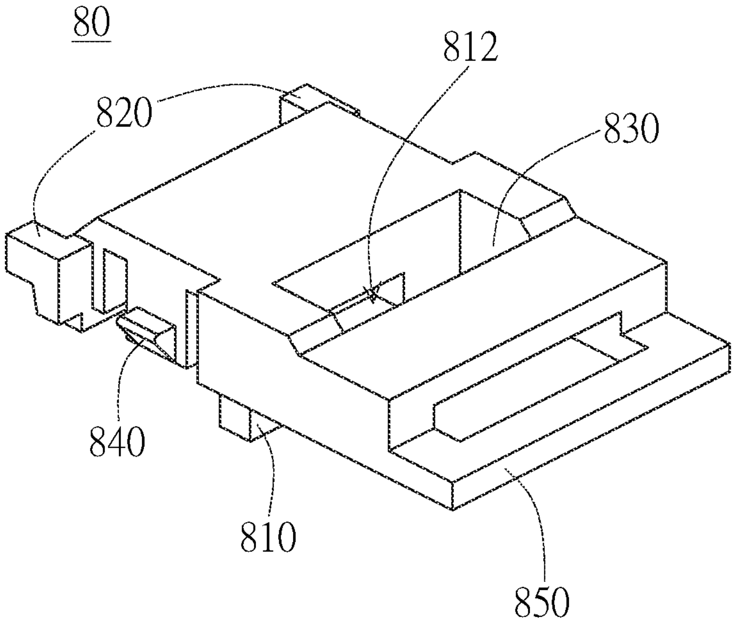
FIGS. 8A and 8B are schematic views of the light shield in an embodiment of the invention from different viewing angles.
Figure 8B:
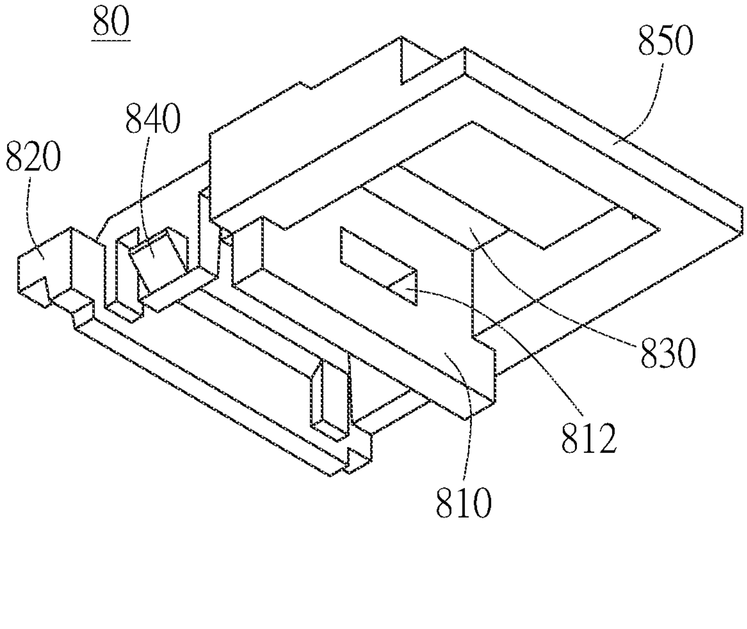

As shown in FIG. 8A and FIG. 8B, the light shield 80 at least partially covers the optical switch 60 to separate the optical switch 60 and the illumination light source 40. Specifically, the light shield 80 can substantially cover the emitter 620 and the receiver 610, and the light shield 80 can have a baffle 810, which is configured to separate the emitter 620 and the receiver 610. The baffle 810 has a slit 812, and the slit 812 is configured to allow the optical signal to pass therethrough. The baffle 810 extends downward from the light shield 80, so the emitter 620 and the receiver 610 are located at opposite sides with respect to the baffle 810 in the X-axis direction. The slit 812 is disposed on the baffle 810 and preferably aligned with the optical signal path P. As such, the emitter 620 and the receiver 610 can be separated by the baffle 810, and the optical signal emitted from the emitter 620 can be received by the receiver 610 through the slit 812.

In an embodiment, the light shield 80 can have an alignment portion 820, an engaging portion 840, a channel 830, and an extension portion 850. The alignment portion 820 is disposed corresponding to the limiting portion 730 of the optical member 70. The alignment portion 820 can be a block, which extends toward the optical member 70 from one side of the light shield 80 adjacent to the optical member 70. When the light shield 80 and the optical member 70 are disposed adjacent to each other in the X-axis direction, the block type alignment portion 820 is received in the notch type limiting portion 730, so as to position the light shield 80. The engaging portions 840 are disposed on the light shield 80 at two opposite sides along the Y-axis direction to correspond to the positioning portions 540 of the baseplate 50. When the light shield 80 is disposed on the baseplate 50, the engaging portion 840 is engaged with the positioning portion 540, so as to position the light shield 80. The channel 830 is disposed corresponding to the blocking portion 230 of the frame 20B and preferably at least partially overlaps the groove 633 of the circuit board 630 in the Z-axis direction. As such, the blocking portion 230 can move in the channel 830 to selectively block the optical signal path P (or interposed between the emitter 620 and the receiver 610) and move into or out of the groove 633. The extension portion 850 extends from one side of the light shield 80 away from the optical member 70. When the light shield 80 is disposed on the baseplate 5, the extension portion 850 extends under the frame 20B and is seated on the baseplate 50 to facilitate the positioning effect of the light shield 80.

Figure 9A:
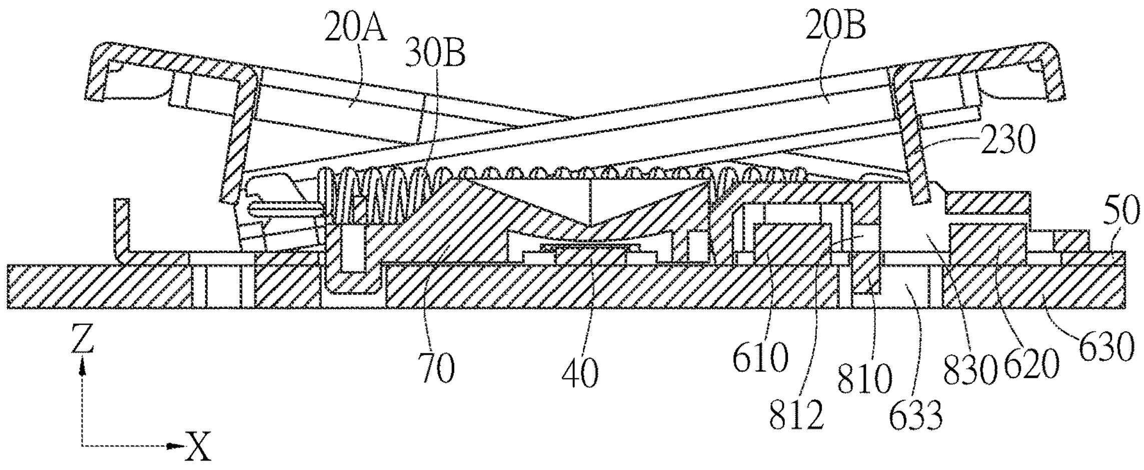
FIGS. 9A to 9C are schematic operation views of the (illuminated) keyswitch in an embodiment of the invention.
Figure 9B:
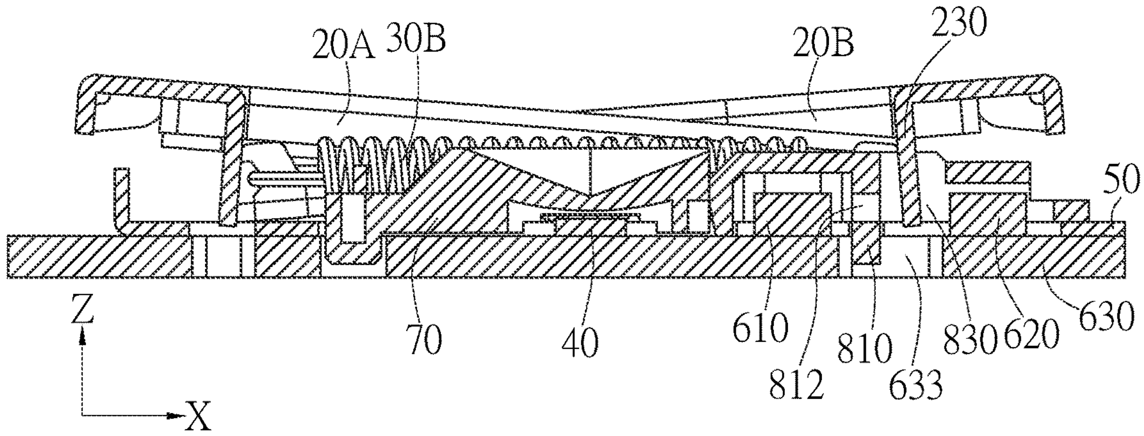
Figure 9C:
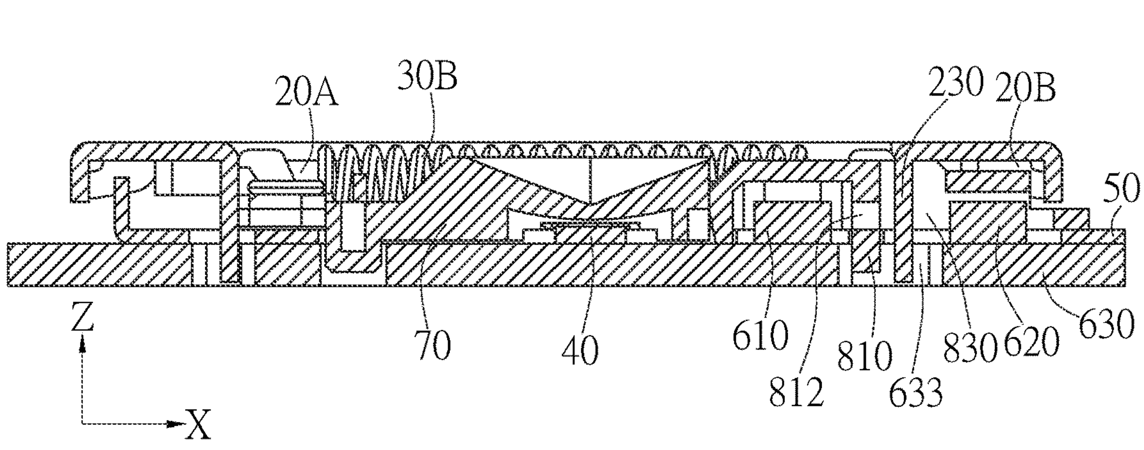

Hereinafter, referring to FIG. 9A to FIG. 9C, the operation of the (illuminated) keyswitch 1 will be described, wherein the keycap 10 is omitted in FIG. 9A to FIG. 9C. As shown in FIG. 9A, when the keyswitch 1 is in the non-pressed state (or initial state), the pair of frames 20A and 20B is at the high position relative to the baseplate 50, and the blocking portion 230 is located at the upper side of the channel 830 of the light shield 80 and away from the optical switch 60. In such a state, the optical signal emitted from the emitter 620 passes through the slit 812 of the light shield 80 and is received by the receiver 610, so the receiver 610 receives the optical signal of a first intensity. As shown in FIG. 9B, when a pressing force is applied to the keycap 10 to drive the frames 20A and 20B to move downward relative to the baseplate 50 to the triggering position, the blocking portion 230 moves in the channel 830 and enters the optical signal path P, so the blocking portion 230 is interposed between the emitter 620 and the receiver 610 and at least partially blocks the slit 812. In such a state, the optical signal emitted from the emitter 620 is at least partially blocked by the blocking portion 230, so only smaller amount of optical signal or even no optical signal can pass the slit 812 of the light shield 80 to be received by the receiver 610, and the receiver 610 receives the optical signal of a second intensity. That is, the second intensity is smaller than the first intensity, or the second intensity is zero (i.e., no optical signal is received). As such, the optical switch 60 is triggered to generate the triggering signal. As shown in FIG. 9C, after the keyswitch 1 is triggered, the pressing force enables the keycap 10 continues to drive the frames 20A and 20B to move further downward relative to the baseplate 50 to the low position, and the blocking portion 230 moves downward in the channel 830 to be inserted into the groove 633 of the circuit board 630. As such, the key stroke distance of the keyswitch 1 can be increased. When the pressing force is released, the elastic members 30A and 30B provide the restoring force to drive the frames 20A and 20B and the keycap 10 to return to the non-pressed state (i.e., the initial state shown in FIG. 9A).

During the operation of the keyswitch 1 illustrated in FIG. 9A to FIG. 9C, since the elastic members 30A and 30B are coupled to the baseplate ends 212A and 212B of the frames 20A and 20B, the movement of the elastic members 30A and 30B in the Z-axis direction is relatively small, and the elastic members 30A and 30B can be considered as not moving up-down with the keycap 10 in the up-down movement. In other words, the elastic members 30A and 30B can be considered as only occurring stretch in the X-axis direction during the up-down movement of the keycap 10, significantly promoting the operation stability of the keyswitch 1. Moreover, since the elastic members 30A and 30B are located at opposite sides of the inner space 200, during the up-down movement of the keycap 10, the vertical projection of the pair of frames 20A and 20B and the vertical projection of the pair of elastic members 30A and 30B surround the inner space 200 without interfering therewith, the illumination light emitted from the centrally positioned illumination light source 40 will not be interfered by the frames 20A and 20B and the elastic members 30A and 30B and pass the substantially unobstructed inner space 200 to illuminate the keycap 10. That is, no keyswitch component that is non-optical components is present in the illumination region 400 of the illumination light, so the luminous uniformity of the keyswitch can be effectively improved.

It is noted that the optical switch is illustrated in the above embodiment, but not limited thereto. In other embodiments, the optical switch can be replaced with other type switches, such as Hall switch or mechanical switch. In an embodiment, the magnet can be disposed on the frame, and the Hall sensor is disposed corresponding to the magnet. The relative position of the magnet and the Hall sensor can be changed in response to the movement of the frame, so the intensity of the sensing signal of the Hall sensor will be changed, and the triggering signal can be generated. In another embodiment, the emitter and the receiver can be embodied as the magnet and the Hall sensor. When the blocking portion moves relative to the magnet and the Hall sensor, the intensity of the sensing signal of the Hall sensor will be changed, and the triggering signal can be generated.

Although the preferred embodiments of the invention have been described herein, the above description is merely illustrative. The preferred embodiments disclosed will not limit the scope of the invention. Further modification of the invention herein disclosed will occur to those skilled in the respective arts and all such modifications are deemed to be within the scope of the invention as defined by the appended claims.

What is claimed is:

1. An illuminated keyswitch, comprising:
- a keycap;
- a pair of frames adapted to support the keycap in an up-down movement, each of the pair of frames having a pair of side arms and a pair of bend structures respectively disposed on middle sections of the pair of side arms, the pair of bend structures of one of the pair of frames correspondingly coupled to the pair of bend structures of the other of the pair of frames, so the pair of frames is rotatably coupled to each other to define an inner space under the keycap;
- a pair of elastic members connecting the pair of frames to be located at two opposite sides of the inner space, respectively; and
- an illumination light source disposed between the pair of elastic members in the inner space and adapted to provide an illumination light,
- wherein during the up-down movement of the keycap, a vertical projection of the pair of frames surrounds the inner space without interfering therewith, so the illumination light passes the inner space to illuminate the keycap.

2. The illuminated keyswitch of claim 1, further comprising an optical member disposed between the illumination light source and the keycap and configured to modulate an optical property of the illumination light.

3. The illuminated keyswitch of claim 1, wherein the pair of side arms of one of the pair of frames and the pair of side arms of the other of the pair of frames are alternatingly disposed along an axial line.

4. The illuminated keyswitch of claimer 1, wherein the pair of bend structures comprises a receiving portion and a pressing portion; the pressing portion of one of the pair of frames interacts with the receiving portion of the other of the pair of frames, and the receiving portion of the one of the pair of frames interacts with the pressing portion of the other of the pair of frames.

5. The illuminated keyswitch of claim 1, further comprising an optical switch having an optical signal path, and the illumination light source is disposed in a straight line with the optical signal path.

6. The illuminated keyswitch of claim 5, wherein one of the pair of frames has a blocking portion configured to selectively block the optical signal path in response to a movement of the pair of frames.

7. The illuminated keyswitch of claim 5, further comprising a light shield at least partially shielding the optical switch to separate the optical switch and the illumination light source.

8. The illuminated keyswitch of claim 7, wherein the optical switch comprises an emitter and a receiver; the emitter emits an optical signal to the receiver; the light shield has a baffle configured to separate the emitter and the receiver; the baffle has a slit for the optical signal to pass therethrough.

9. The illuminated keyswitch of claim 1, wherein each of the pair of frames has a keycap end and a baseplate end, and each of the pair of the elastic members connects the baseplate ends of the pair of frames.

10. The illuminated keyswitch of claim 9, wherein the baseplate end of one of the pair of frames is closer to the keycap end of the other of the pair of frames than the baseplate end of the other of the pair of frames.

11. The illuminated keyswitch of claim 10, wherein during the up-down movement of the keycap, the pair of elastic members substantially does not move up-down with the keycap.

12. The illuminated keyswitch of claim 9, wherein the pair of frames is substantially identical; each of the pair of frames is a U-shaped frame with the pair of side arms; the pair of frames is disposed corresponding to each other to substantially avoid an illumination area of the illumination light without interfering with the illumination light.

13. The illuminated keyswitch of claim 12, wherein each of the pair of frames has an extension portion at the keycap end; the extension portion extends from one of the pair of side arms, so the extension portion of one of the pair of frames corresponds to one of the pair of side arms of the other of the pair of frames, and the pair of frames has a substantially rectangular contour in a plan view.

14. A keyswitch, comprising:
- a keycap;
- a pair of U-shaped frames adapted to support the keycap in an up-down movement, each of the pair of U-shaped frames having a pair of side arms extending in parallel and a pair of bend structures respectively disposed on middle sections of the pair of side arms, the pair of bend structures of one of the pair of U-shaped frames correspondingly coupled to the pair of bend structures of the other of the pair of U-shaped frames, so the pair of U-shaped frames is rotatably coupled to each other along an axial line, and the four side arms of the pair of U-shaped frames constitute two sets of side arms arranged apart from each other in parallel to define an inner space under the keycap between the two sets of side arms; and a pair of elastic members connecting the pair of U-shaped frames, the pair of elastic members disposed in parallel beside the two sets of side arms so as to be located at two opposite sides of the inner space, respectively, wherein the pair of elastic members connects the pairs of U-shaped frames along a direction perpendicular to the axial line, wherein during the up-down movement of the keycap, a vertical projection of the pair of U-shaped frames and a vertical projection of the pair of elastic members surround the inner space without interfering therewith.

15. The keyswitch of claim 14, wherein the pair of side arms of one of the pair of U-shaped frames and the pair of side arms of the other of the pair of U-shaped frames are alternatingly disposed along the axial line.

16. The keyswitch of claim 14, further comprising an optical switch having an optical signal path; one of the pair of U-shaped frames has a blocking portion configured to selectively block the optical signal path in response to a movement of the pair of U-shaped frames.

17. The keyswitch of claim 14, wherein the pair of U-shaped frames is substantially identical; each of the pair of U-shaped frames has a keycap end and a baseplate end; the baseplate end of one of the pair of U-shaped frames is closer to the keycap end of the other of the pair of U-shaped frames than the baseplate end of the other of the pair of U-shaped frames; each of the pair of the elastic members connects the baseplate ends of the pair of U-shaped frames.

18. The keyswitch of claim 17, wherein each of the pair of U-shaped frames has an extension portion at the keycap end; the extension portion extends from one of the pair of side arms, so the extension portion of one of the pair of U-shaped frames corresponds to one of the pair of side arms of the other of the pair of U-shaped frames.

19. An illuminated keyswitch, comprising:

a keycap;

a pair of frames adapted to support the keycap in an up-down movement, the pair of frames disposed corresponding to each other and substantially rotatably coupled to each other at middle sections of the pair of frames to define an inner space under the keycap;

a pair of elastic members connecting the pair of frames to be located at two opposite sides of the inner space, respectively;

an illumination light source disposed between the pair of elastic members in the inner space and adapted to provide an illumination light; and an optical switch having an optical signal path, wherein an extension line of the optical signal path passes through the illumination light source between the pair of elastic members, wherein during the up-down movement of the keycap, a vertical projection of the pair of frames surrounds the inner space without interfering therewith, so the illumination light passes the inner space to illuminate the keycap.

* * * * *